United States Patent [19]
Fujita

[11] Patent Number: 5,339,758
[45] Date of Patent: Aug. 23, 1994

[54] REMAINING BOBBIN-THREAD AMOUNT MEASURING APPARATUS FOR SEWING MACHINE

[75] Inventor: Tomoyuki Fujita, Tajimi, Japan

[73] Assignee: Brother Kogyo Kabushiki Kaisha, Nagoya, Japan

[21] Appl. No.: 70,901

[22] Filed: Jun. 3, 1993

[30] Foreign Application Priority Data

Jun. 22, 1992 [JP] Japan .................. 4-163079

[51] Int. Cl.⁵ .................. G01B 5/02; G01B 7/02; D05B 69/36
[52] U.S. Cl. .................. 112/278
[58] Field of Search .............. 112/273, 278, 181, 182, 112/184; 242/37 R

[56] References Cited

U.S. PATENT DOCUMENTS

| | | | |
|---|---|---|---|
| 4,216,733 | 8/1980 | Kornatowski | 112/273 X |
| 4,237,807 | 12/1980 | Meier | 112/273 X |
| 4,558,654 | 12/1985 | Schilling | 112/273 X |

FOREIGN PATENT DOCUMENTS 61-43075 9/1986 Japan .
61-180685 11/1986 Japan .
63-136591 9/1988 Japan .

Primary Examiner—Peter Nerbun
Attorney, Agent, or Firm—Oliff & Berridge

[57] ABSTRACT

An apparatus for measuring a remaining amount of a bobbin thread wound on a bobbin accommodated in a shuttle of a sewing machine, including a measurement bar displaceable along a displacement path from outside the shuttle toward an axis line of the bobbin inside the shuttle, a driver which displaces the measurement bar along the displacement path so that a free end of the bar contacts the outer surface of a roll of bobbin thread wound on the bobbin, a sensor which detects the displacement of the measurement bar and generates a displacement signal representative of continuous change in displacement amount of the bar, a signal-characteristic determining and storing device which determines a characteristic of the displacement signal based on respective values of the displacement signal when the measurement bar is located at a plurality of reference positions on the displacement path, and stores data indicative of the determined signal characteristic, and a remaining-amount determining device which determines the remaining amount of the bobbin thread left on the bobbin, based on the stored signal characteristic and a value of the displacement signal when the free end of the measurement bar contacts the outer surface of the roll of bobbin thread.

22 Claims, 7 Drawing Sheets

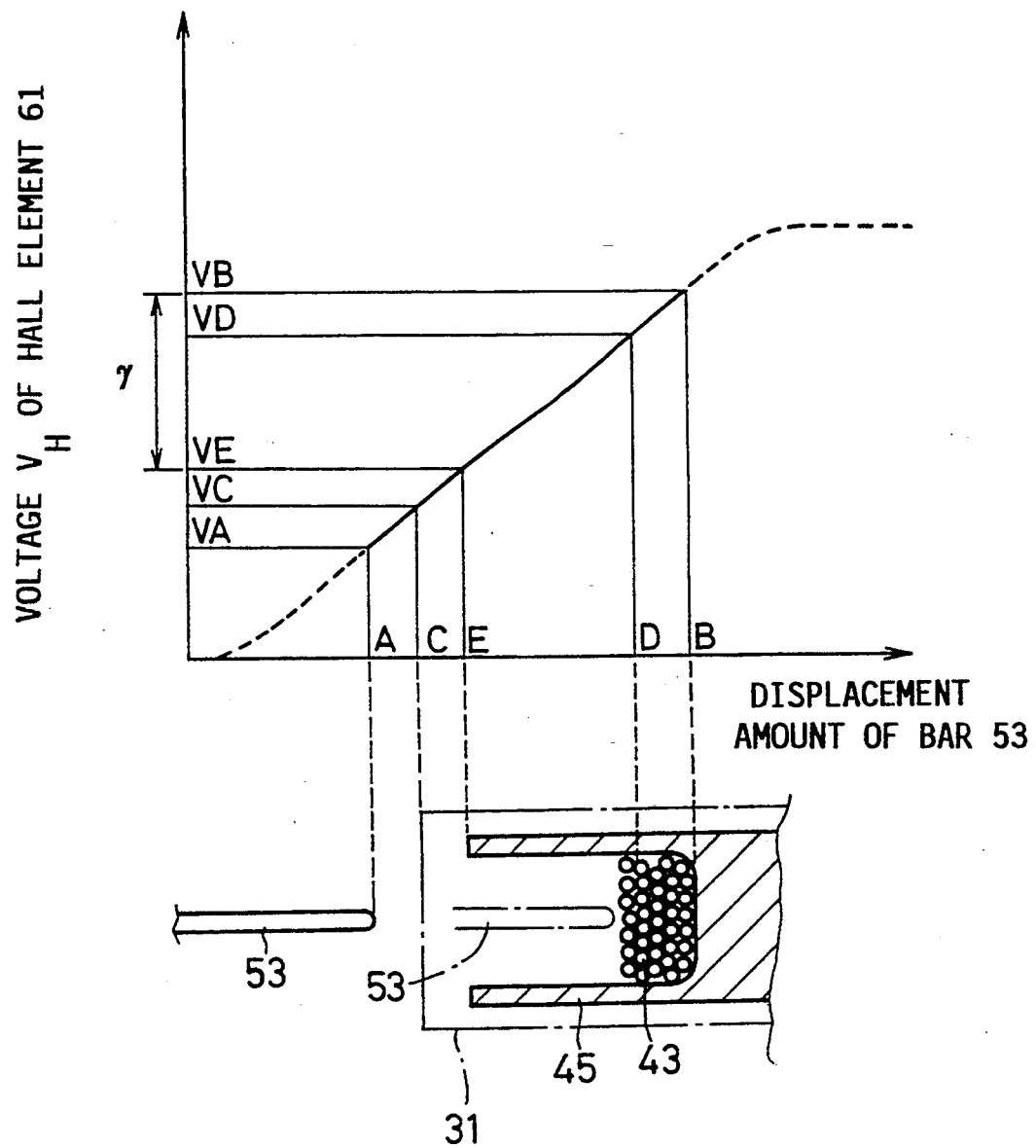

REMAINING BOBBIN-THREAD AMOUNT MEASURING APPARATUS FOR SEWING MACHINE

BACKGROUND OF THE INVENTION

1. Field of the Invention

The present invention relates to an apparatus for measuring the remaining amount of bobbin thread wound on a bobbin accommodated in a shuttle of a sewing machine.

2. Related Art Statement

Japanese Non-Examined Utility Model Application laid open under Publication (JITSU-KAI-SHO) No. 61(1986)-180685 discloses an example of the remaining bobbin-thread amount measuring apparatus. The disclosed apparatus is of optical type wherein, when the rotation of a rotating hook of a shuttle is stopped, a light is emitted toward the outer surface of a roll of bobbin thread wound on a bobbin accommodated in the rotating hook and the light reflected from the roll of bobbin thread and detected by an optical sensor is utilized to determine the remaining amount of the thread left on the bobbin. However, the sensitivity of the optical sensor is lowered due to dust or oil adhered thereto. Another problem with the measuring apparatus is that the sensitivity of the optical sensor changes depending upon colors of bobbin thread. Thus, in some cases, the optical-type apparatus cannot measure the remaining amount of bobbin thread with sufficiently high accuracy.

Meanwhile, Japanese Examined Patent Application laid open for opposition purpose under Publication (TOKU-KO-SHO) No. 61(1986)-43075 discloses a near-end detecting apparatus. The disclosed apparatus is of mechanical type which includes (a) a measurement bar which is displaceable along a displacement path from outside a shuttle toward the axis line of a bobbin accommodated in the shuttle, (b) a measurement-bar driver which displaces the measurement bar along the displacement path so that a free end of the bar contacts the outer surface of a roll of bobbin thread wound on the bobbin, after the rotation of the shuttle has been stopped, the driver retracting the measurement bar away from the outer limit of a locus of rotation of the shuttle before the rotation of the shuttle is started, and (c) a near-end microswitch which is adapted to close when the displacement of the measurement bar results in the contact thereof with the bobbin thread indicating that the displacement exceeds a predetermined value during the time that the bobbin has been gradually consumed, the closing of the microswitch triggering an alarm.

Thus, the near-end detecting apparatus identifies that the bobbin thread wound around the bobbin is reduced to near-end, i.e., near-zero. However, the apparatus cannot measure a remaining amount of the bobbin thread left on the bobbin.

In the event that the location of disposition of the near-end microswitch is changed even a slight distance, the microswitch triggers an alarm at an inaccurate displacement amount of the measurement bar different from the above-indicated predetermined value. Therefore, the near-end detection apparatus suffers from insufficient accuracy of the detection of near-end.

Furthermore, the near-end detecting apparatus has a third problem that the measurement bar may jam up by being interfered with by other parts when the bar is displaced out of the shuttle after the free end of the bar has contacted the roll of bobbin thread on the bobbin. In that event, the measurement bar cannot be retracted away from the outer limit of the locus of rotation of the rotating hook and, if the rotation of the hook is started, then the hook collides with the measurement bar so that both the hook and the bar are damaged.

For solving the above-indicated third problem of the near-end detecting apparatus, Japanese Non-Examined Utility Model Application laid open under Publication (JITSU-KAI-SHO) No. 63(1988)-136591 discloses an improved near-end detecting apparatus. The improved, third apparatus includes a first sensor which identifies that a measurement bar has been retracted away from the outer limit of rotation locus of a shuttle, in addition to a second sensor which detects the near-end of bobbin thread, i.e., identifies that the displacement of the measurement bar till the contact thereof with the bobbin thread left on a bobbin has exceeded a predetermined value corresponding to the near-end of bobbin thread.

However, the third apparatus suffers from the complicated construction due to the employment of the two sensors, and accordingly it suffers from increased cost of manufacture.

SUMMARY OF THE INVENTION

It is therefore an object of the present invention to provide an apparatus which accurately measures a remaining bobbin-thread amount.

The above object has been achieved by the present invention. According to a first aspect of the present invention, there is provided an apparatus for measuring a remaining amount of a bobbin thread which is wound around a bobbin accommodated in a shuttle of a sewing machine, comprising (a) a measurement bar which is displaceable along a displacement path from outside the shuttle toward an axis line of the bobbin inside the shuttle, (b) a measurement-bar driver which displaces the measurement bar along the displacement path so that a free end of the measurement bar contacts an outer surface of a roll of the bobbin thread wound around the bobbin, (c) a displacement sensor which detects the displacement of the measurement bar, the sensor generating a displacement signal representative of a continuous change in a displacement amount of the measurement bar, (d) signal-characteristic determining and storing means for determining a characteristic of the displacement signal based on respective values of the displacement signal when the measurement bar is located at a plurality of reference positions on the displacement path, and storing data indicative of the determined signal characteristic, and (e) remaining-amount determining means for determining the remaining amount of the bobbin thread wound around the bobbin, based on the signal characteristic stored by the signal-characteristic determining and storing means and a value of the displacement signal when the free end of the measurement bar contacts the outer surface of the roll of the bobbin thread.

In the remaining bobbin-thread amount measuring apparatus constructed as described above, the displacement sensor generates a displacement signal representative of continuous change in the displacement amount of the measurement bar. However, the correspondence relationship between a value (e.g., magnitude) of the displacement signal and an actual displacement amount of the measurement bar, which relationship may be expressed by a linear or higher-order function equation, may more or less change due to time-wise change in the sensitivity of the displacement sensor and/or change in the location of disposition of the sensor. Therefore, the signal-characteristic determining and storing means determines a characteristic of the displacement signal based on respective values of the displacement signal when the measurement bar is located at a plurality of reference positions on the displacement path, and stores data indicative of the determined signal characteristic. The reference positions may include a zero-amount position where the free end of the measurement bar contacts a thread-supporting, axis portion of the bobbin from which all the bobbin thread has been removed, and/or a displacement-start position where the displacement of the measurement bar starts toward the the bobbin along the displacement path. The determined characteristic of the displacement signal defines the above-indicated correspondence relationship between a value of the displacement signal and an actual displacement amount of the measurement bar. In the case where the correspondence relationship is expressed by a linear function, $Y = aX + b$ wherein X is a value of the signal, Y is an actual displacement amount of the bar, and a, b are constants, those constants a, b represent the characteristic of the displacement signal. The displacement signal may be a continuous signal which monotonously changes with the continuous change in the displacement amount of the bar. In this case, parameter X is replaced by a magnitude of the continuous signal. On the other hand, the displacement signal may be constituted by a plurality of pulse or square-wave signals which are sequentially generated with the continuous change in the displacement amount of the bar. In the latter case, parameter X is replaced by the number of the generated signals as counted from the start of the displacement of the bar. The remaining-amount determining means determines the remaining amount of the bobbin thread wound on the bobbin, based on the stored signal characteristic and a value of the displacement signal when the free end of the measurement bar contacts the outer surface of the thread left on the bobbin. Since a value of the displacement signal when the bar contacts the bobbin thread is accurately related, according to the signal characteristic, to an actual displacement amount of the bar, i.e., actual remaining amount of the bobbin thread. Thus, the present measuring apparatus measures the remaining bobbin-thread amount with high accuracy.

According to a preferred feature of the present invention, the measuring apparatus further comprises means for determining, based on the signal characteristic stored by the signal-characteristic determining and storing means and a reference bobbin-thread amount, a value of the displacement signal when the free end of the measurement bar contacts an outer surface of a roll of the bobbin thread which is wound around the bobbin in the reference bobbin-thread amount. The measuring apparatus may further comprise an input device which includes at least one manually operable member and sets the reference bobbin-thread amount in response to operation of the manually operable member. The measuring apparatus may also comprise a display device which displays the reference bobbin-thread amount set by the input device.

According to another feature of the present invention, the measuring apparatus further comprises an alarm device which informs an operator that the remaining amount of the bobbin thread determined by the remaining-amount determining means is less than a reference bobbin-thread amount.

According to yet another feature of the present invention, the measuring apparatus further comprises a display device which displays the remaining amount of the bobbin thread determined by the remaining-amount determining means.

According to a further feature of the present invention, the remaining-amount determining means determines the remaining amount of the bobbin thread in terms of a ratio thereof to an upper-limit bobbin-thread amount.

According to another feature of the present invention, the measuring apparatus further comprises means for determining, based on the signal characteristic stored by the signal-characteristic determining and storing means, a value of the displacement signal when the free end of the measurement bar is located, on the displacement path, at a safety position just away from an outer limit of a locus of rotation of a rotating hook of the shuttle. The measuring apparatus may further comprise an inhibiting device which inhibits operation of a driver which rotates the rotating hook, for at least a time duration in which the free end of the measurement bar is located between the bobbin and the outer limit of the locus of rotation of the shuttle on the displacement path. Since the present measuring apparatus measures the displacement amount of the measurement bar with high accuracy as described above, the present apparatus determines the remaining bobbin-thread amount with sufficient safety by effectively avoiding the collision of the measurement bar and the rotating hook. Additionally, the displacement signal generated from the displacement sensor is used for not only measuring the remaining bobbin-thread amount but also avoiding the collision of the measurement bar and the rotating hook. This arrangement does not result in complicating the construction of the present apparatus.

According to yet another feature of the present invention, the measuring apparatus further comprises a control device which automatically operates the measurement-bar driver, the displacement sensor, and the remaining-amount determining means so as to determine the remaining amount of the bobbin thread, in a condition in which the rotating hook is being stopped at a non-interference angular position where the hook does not interfere with the displacement path along which the measurement bar displaces. In this case, the control device may automatically operate the measurement-bar driver, the displacement sensor, and the remaining-amount determining means so as to determine the remaining amount of the bobbin thread, each time the rotating hook is stopped at the non-interference angular position.

According to a further feature of the present invention, the measuring apparatus further comprises a manually operable member which is operable to input a signal-characteristic determination command to determine the characteristic of the displacement signal, and a control device which operates, in response to operation of the manually operable member, the measurement-bar driver, the displacement sensor, and the signal-characteristic determining and storing means so as to determine the characteristic of the displacement signal. The measuring apparatus may further comprise a rotating device which automatically rotates the rotating hook to a non-interference angular position where the hook does not interfere with the displacement path, in a case where the hook is being stopped at an angular position different from the non-interference angular position when the manually operable member is operated to input the signal-characteristic determination command.

In a preferred embodiment of the present invention, the measurement-bar driver comprises an actuator including an output member, and a connecting device provided between the measurement bar and the output member of the actuator, so as to connect the measurement bar and the output member to each other such that the bar is movable relative to the output member in opposite directions in which the bar advances toward, and retracts away from, the bobbin of the shuttle, the connecting device defining a limit of the movement of the measurement bar relative to the output member in the direction in which the bar advances toward the bobbin, and an elastic member which biases the measurement bar toward the above-indicated limit of movement thereof. In a preferred form of the apparatus, the connecting device may comprise a movable member which is engaged with the output member of the actuator and which is engaged with the measurement bar such that the movable member is movable relative to the measurement bar along an axis line of the bar, a support member which supports the movable member and the measurement bar such that the movable member and the measurement bar are movable along the axis line of the bar, and an engagement portion defined by the measurement bar, the elastic member being disposed between the measurement bar and the movable member to bias the measurement bar and the movable member in a direction in which the movable member is to be engaged with the engagement portion of the bar, the engagement of the movable member and the engagement portion defining the limit of movement of the bar relative to the output member of the actuator in the direction in which the bar advances toward the bobbin. In this case, the support member may indirectly support the measurement bar via the movable member. The actuator may comprise a rotary actuator which rotates the output member about an axis line of the actuator so that the output member displaces the movable member along the axis line of the measurement bar. The actuator may otherwise be a linear actuator such as a linear motor.

In the apparatus according to the present invention, the plurality of reference positions on the displacement path may comprise, in addition to, or in place of, the above-described (a) the zero-amount position and/or (b) the displacement-start position, (c) a position where the free end of the measurement bar contacts an outer surface of a rotating hook as a part of the shuttle which surface defines an outer limit of a locus of rotation of the shuttle, and (d) a full-amount position where the free end of the measurement bar contacts an outer surface of a roll of the bobbin thread which is wound in an upper-limit amount around the axial portion of the bobbin.

According to a second aspect of the present invention, there is provided an apparatus for measuring a remaining amount of a bobbin thread which is wound around a bobbin accommodated inside a rotating hook of a shuttle of a sewing machine, comprising (a) a measurement bar which is displaceable along a displacement path from outside of the shuttle toward an axis line of the bobbin inside of the shuttle, (b) a measurement-bar driver which displaces the measurement bar so that a free end of the measurement bar contacts an outer surface of a roll of the bobbin thread wound around the bobbin, (c) a displacement sensor which detects the displacement of the measurement bar, the sensor generating a displacement signal representative of a continuous change in a displacement amount of the measurement bar, (d) remaining-amount determining means for determining the remaining amount of the bobbin thread wound around the bobbin, based on a value of the displacement signal when the free end of the measurement bar contacts the outer surface of the roll of the bobbin thread, and (e) an inhibiting device which inhibits, based on the displacement signal, operation of a driver which rotates the rotating hook, for at least a time duration in which the free end of the measurement bar is located, on the displacement path, between the bobbin and an outer limit of a locus of rotation of the rotating hook.

According to a third aspect of the present invention, there is provided an apparatus for measuring a remaining amount of a bobbin thread which is wound around a bobbin accommodated in a shuttle of a sewing machine, comprising (a) a measurement bar which is displaceable along a displacement path from outside of the shuttle toward an axis line of the bobbin inside of the shuttle, (b) a measurement-bar driver which displaces the measurement bar so that a free end of the measurement bar contacts an outer surface of a roll of the bobbin thread wound around the bobbin, (c) a displacement sensor which detects the displacement of the measurement bar, the sensor generating a displacement signal representative of a continuous change in a displacement amount of the measurement bar, (d) remaining-amount determining means for determining the remaining amount of the bobbin thread wound around the bobbin, based on a value of the displacement signal when the free end of the measurement bar contacts the outer surface of the roll of the bobbin thread, (e) an input device which includes a manually operable member and sets a reference bobbin-thread amount in response to operation of the manually operable member, and (f) an alarm device which informs an operator that the remaining amount of the bobbin thread determined by the remaining-amount determining means is less than the reference bobbin-thread amount.

According to a fourth aspect of the present invention, there is provided a bobbin-thread supplying apparatus for supplying a bobbin thread which cooperates with a needle thread carried by a sewing needle of a sewing machine to form stitches into a work sheet, comprising (A) a shuttle including (a) a bobbin around which the bobbin thread is wound, (b) a rotating hook which is rotatable for catching the needle thread, the rotating hook defining an outer limit of a locus of rotation of the shuttle, and (c) a rotating-hook driver which rotates the rotating hook, (B) a remaining bobbin-thread measuring device including (d) a measurement bar which is displaceable along a displacement path from outside of the shuttle toward an axis line of the bobbin inside of the shuttle, (e) a measurement-bar driver which displaces the measurement bar so that a free end of the measurement bar contacts an outer surface of a roll of the bobbin thread wound around the bobbin, (f) a displacement sensor which detects the displacement of the measurement bar, the sensor generating a displacement signal representative of a continuous change in a displacement amount of the measurement bar, (g) remaining-amount determining means for determining the remaining amount of the bobbin thread wound around the bobbin, based on a value of the displacement signal when the free end of the measurement bar contacts the outer surface of the roll of the bobbin thread, and (C) a control device which controls operation of the rotating-hook driver and operation of the remaining bobbin-thread measuring device including the measurement-bar driver.

In a preferred embodiment of the bobbin-thread supplying apparatus, the shuttle further includes a bobbin case which accommodates the bobbin, the bobbin case having an aperture which allows the free end of the measurement bar to pass therethrough and contact the outer surface of the roll of the bobbin thread.

BRIEF DESCRIPTION OF THE DRAWINGS

The above and optional objects, features and advantages of the present invention will be better understood by reading the following detailed description of the presently preferred embodiments of the invention when considered in conjunction with the accompanying drawings in which:

FIG. 7 is a graph and a sectional view for explaining the characteristic of the displacement signal generated from the Hall element of the measuring apparatus of FIG. 1.

DETAILED DESCRIPTION OF THE PREFERRED EMBODIMENTS

Figure 1:
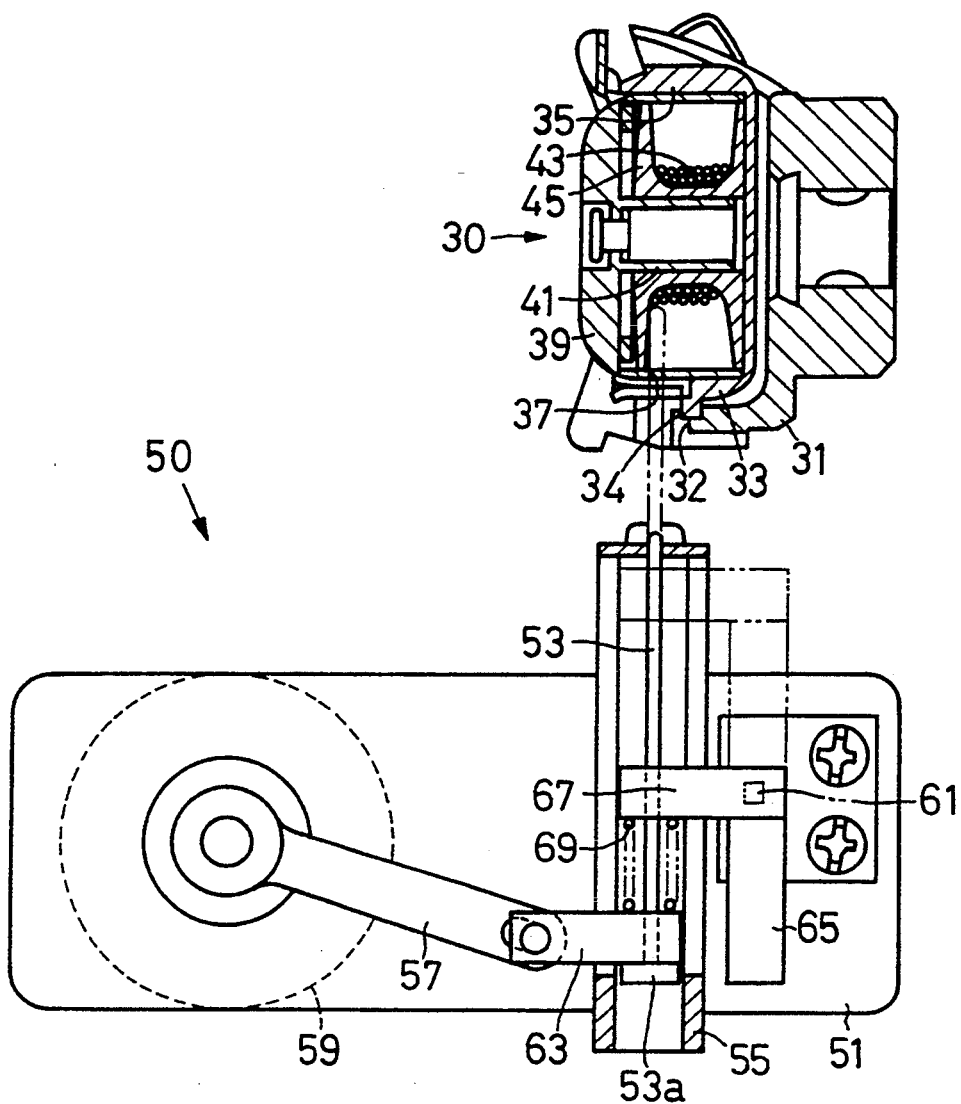
FIG. 1 is a partially sectional, front view of a remaining bobbin-thread amount measuring apparatus embodying the present invention, the measuring apparatus being employed in a bobbin-thread supplying apparatus of an automatic sewing machine.
Figure 2:
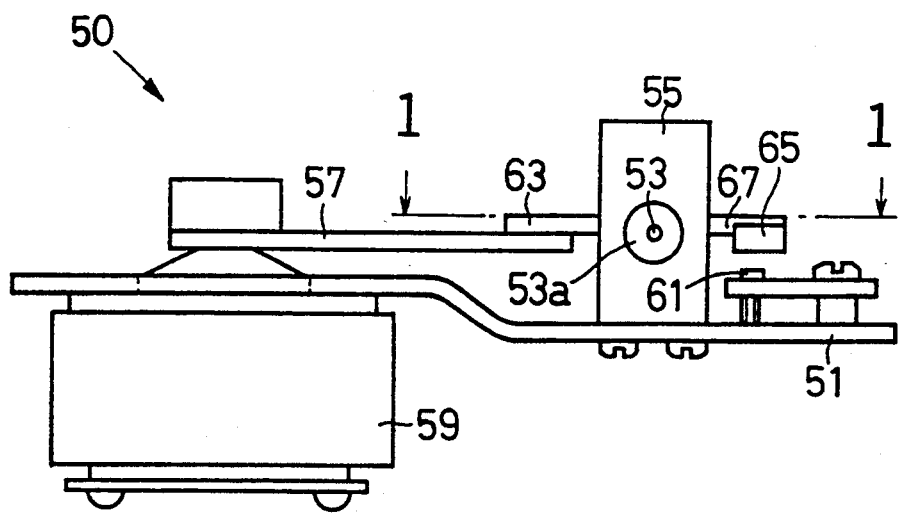
FIG. 2 is a bottom view of the measuring apparatus of FIG. 1.

Referring to FIGS. 1 and 2, there is shown a remaining bobbin-thread amount monitor embodying the present invention. The bobbin thread monitor is employed in a bobbin-thread supplying apparatus for an automatic sewing machine. In FIG. 1, a measurement-bar guide 55 is cross-sectioned as taken along line 1—1 in FIG. 2.

The present bobbin thread monitor is applied to an automatic sewing machine (FIG. 4) having a shuttle 30 which is provided in the bed of the machine and cooperates with a vertically reciprocatable sewing needle to catch a needle thread carried by the needle and thereby form lock stitches into a work sheet such as a fabric or leather.

As shown in FIG. 1, the shuttle 30 includes a rotating hook 31 which is rotatable in synchronism with the vertical reciprocation of the sewing needle, and a bobbin case holder 33 which is disposed stationary inside the rotating hook 31. The bobbin case holder 33 includes a cylindrical holder portion 35 inside which a bobbin case 39 having an aperture 37 in the cylindrical wall thereof detachably fits in position. With the bobbin case 39 fitting in position in the bobbin case holder 33, the aperture 37 of the bobbin case 39 faces vertically downward.

The bobbin case 39 includes an axially extending, hollow support portion 41 on which a bobbin 45, around which a bobbin thread 43 is wound, detachably and rotatably fits. The rotating hook 31 and the bobbin case holder 33 have a first opening 32 and a second opening 34, respectively. The second opening 34 of the bobbin case holder 33 is aligned with the aperture 37 of the bobbin case 39 fitted in position in the holder 33. When the sewing operation of the sewing machine is ended, the rotation of the rotating hook 31 is automatically stopped at a predetermined angular position in which the first opening 32 of the rotating hook 31 is aligned with the aperture 37 of the bobbin case 39 and the second opening 34 of the bobbin case holder 33.

Vertically downward of the shuttle 30, there is disposed a detector part 50 of the invention bobbin thread monitor. The detector part 50 is secured to the frame member of the sewing machine with the help of a mount plate 51. The detector part 50 includes a measurement bar 53 and a measurement-bar guide 55 which supports the measurement bar 53 such that the bar 53 is displaceable in the axial direction thereof relative to the guide 55. The measurement-bar guide 55 is fixed to the mount plate 51 such that the guide 55 vertically extends. The mount plate 51 also supports a rotary solenoid 59 which drives or displaces the measurement bar 53 via an arm member 57. In the present embodiment, the rotary solenoid 59 serves as an actuator which displaces the measurement bar 53 along a predetermined path relative to the bobbin 45 of the shuttle 30.

The mount plate 51 further supports a Hall element 61 which generates an electric signal whose magnitude of voltage is proportional with the magnitude of magnetic field in which the Hall element 61 stands. More specifically, the voltage of the electric signal generated from the Hall element 61 is proportional with the magnitude of a component of the magnetic field of a permanent magnet 65 which component is perpendicular to the plane of sheet of FIG. 1. The N and S poles of the permanent magnet 65 correspond to the upper and lower end portions thereof as seen in FIG. 1, respectively. When the middle portion of the magnet 65 is just aligned with the Hall element 61, the magnitude of the pertinent component of the magnetic field becomes zero and therefore the magnitude of the electric signal becomes zero volt. However, a bias voltage is applied to the signal in the Hall element 61. The voltage signal generated from the Hall element 61 is represented by, for example, a curve shown in FIG. 7 (described in detail later).

A measurement-bar holder 63 is connected to the free end of the arm member 57 such that the holder 63 and the arm 57 are rotatable relative to each other. The measurement bar 53 extends through the measurement-bar holder. 63 such that the bar 53 is displaceable relative to the holder 63. A magnet holder 67 which supports at the free end thereof the above-described permanent magnet 65, is fixed to the middle portion of the measurement bar 53. Between the two holders 63 and 67, a coil spring 69 is provided around the measurement bar 53. Because of the biasing force of the coil spring 69, the measurement-bar holder 63 is held in pressed contact with the lower-end, headed portion 53a of the measurement bar 53.

As described above, the Hall element 61 is opposed to the permanent magnet 65. The voltage produced in the Hall element 61 due to the magnetic field of the magnet 65, varies with the relative position of the measurement bar 53 to the Hall element 61. Therefore, the voltage variation of the Hall element 61 provides a displacement signal whose magnitude varies with the relative position of the bar 53, i.e., displacement amount of the bar 53. The curve of the displacement signal shown in FIG. 7 can be approximated by a straight line that is expressed by a linear function equation. In the present embodiment, the Hall element 61 serves as a signal generator which generates a displacement signal variable with the displacement amount of the measurement bar 53.

As described previously, the rotation of the rotating hook 31 is automatically stopped at the predetermined angular position, so that the aperture 37 of the bobbin case 39 is exposed outside through the first and second openings 32, 34 of the rotating hook 31 and the bobbin case holder 33. That is, the aperture 37 vertically downwardly faces the measurement bar 53 of the detector part 50. In this situation, upon energization of the rotary solenoid 59, the arm member 57 is rotated in a counter-clockwise direction as seen in FIG. 1, so that the measurement-bar holder 63 vertically upwardly displaces. Because of the upward displacement of the holder 63, not only the magnet holder 67 but also the measurement bar 53 to which the holder 67 is fixed are vertically upwardly displaced due to the elastic force of the coil spring 69.

Consequently, the measurement bar 53 is displaced along a predetermined path relative to the bobbin 45 of the shuttle 30 through the first and second openings 32, 34 and aperture 37, as shown in two-dot chain line in FIG. 1, so that the upper, free end of the bar 53 eventually contacts the bobbin thread 43 wound on the bobbin 45. Therefore, the amount of displacement of the measurement bar 53 until the bar 53 contacts the bobbin thread 43 corresponds to the remaining amount of the bobbin thread 43. The coil spring 69 provided between the measurement bar 53 and the magnetic holder 67 serves for buffering the impact produced when the bar 53 is forced to contact the bobbin thread 43.

Subsequently, upon deenergization of the rotary solenoid 59, the arm member 57 is rotated in the reverse or clockwise direction to the initial, upward-displacement start position thereof due to the biasing force of a spring (not shown) provided in the solenoid 59. By this return of the arm member 57, the measurement bar 53 is vertically downwardly displaced so as to be retracted into the measurement-bar guide 55.

Figure 3:
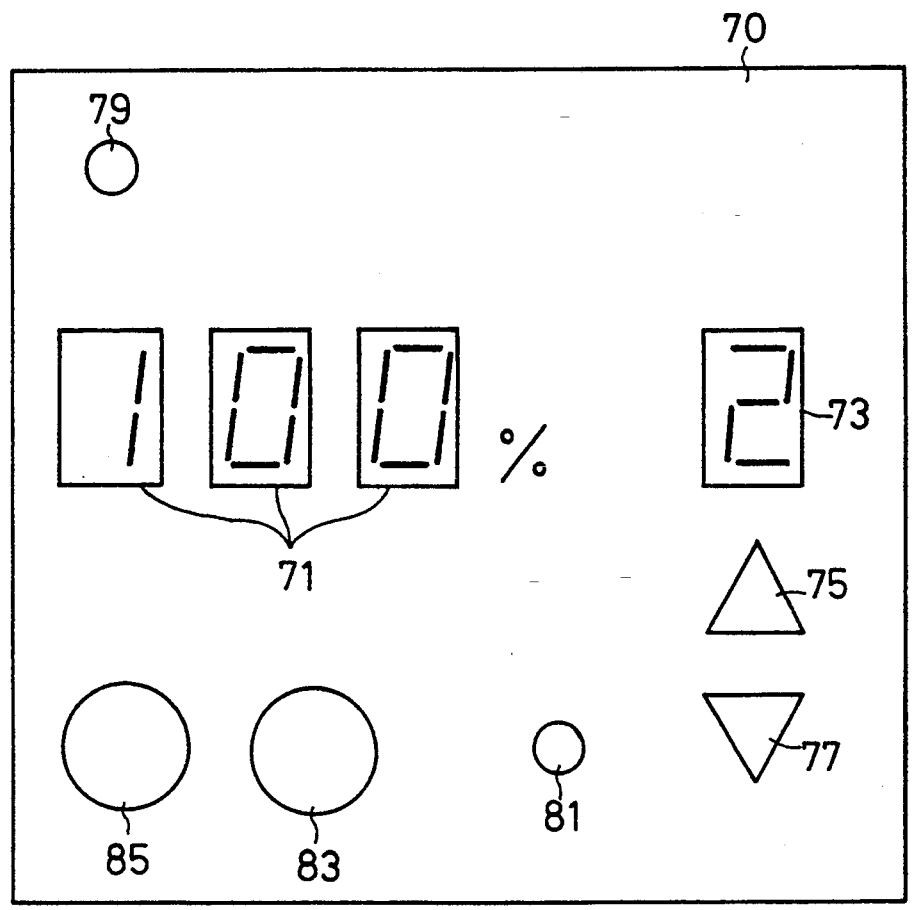
FIG. 3 is a front view of a display panel as a part of the measuring apparatus of FIG. 1.

The invention remaining bobbin thread monitor also includes a display panel 70 as shown in FIG. 3. The display panel 70 includes, at a central portion thereof, a remaining bobbin-thread amount display (first display) 71 which is constituted by three seven-segment digital indicators and which indicates a remaining amount in percentage of the bobbin thread 43 wound on the bobbin 45.

Adjacent the first display 71, is provided a reference bobbin-thread amount display (second display) 73 which is constituted by a single seven-segment digital indicator. The second display 73 indicates a single-figure value indicative of a reference bobbin-thread amount which is set or selected by an operator. When the actual remaining amount of the bobbin thread 43 becomes smaller than the selected reference amount, an alarm is issued. A predetermined look-up table defining the relationship between the reference bobbin-thread amounts and the single-figure values set on the second display 73 is pre-stored in a read only memory (ROM) of a control circuit 90 (FIG. 4, described later) of the present bobbin thread monitor.

The display panel 70 also includes, below the second display 73, an increment key 75 for increasing the value indicated on the second display 73 by increments of one, and a decrement key 77 for decreasing the value indicated on the second display 73 by decrements of one.

Additionally, the display panel 70 includes an alarm lamp 79 and an alarm buzzer 81 which are lighted and triggered, respectively, when the actual remaining amount of the bobbin thread 43 is decreased to less than the reference amount or level corresponding to the single-figure value set on the second display 73. A reset key 83 for stopping the alarming of the buzzer 81, is also provided on the display panel 70.

The display panel 70 further includes a calibration key 85 for calibrating the Hall element 61, i.e., determining the characteristic of the displacement signal generated by the Hall element 61, and storing data indicative of the determined signal characteristic in a random access memory (RAM) 97 of the control circuit 90.

Figure 4:
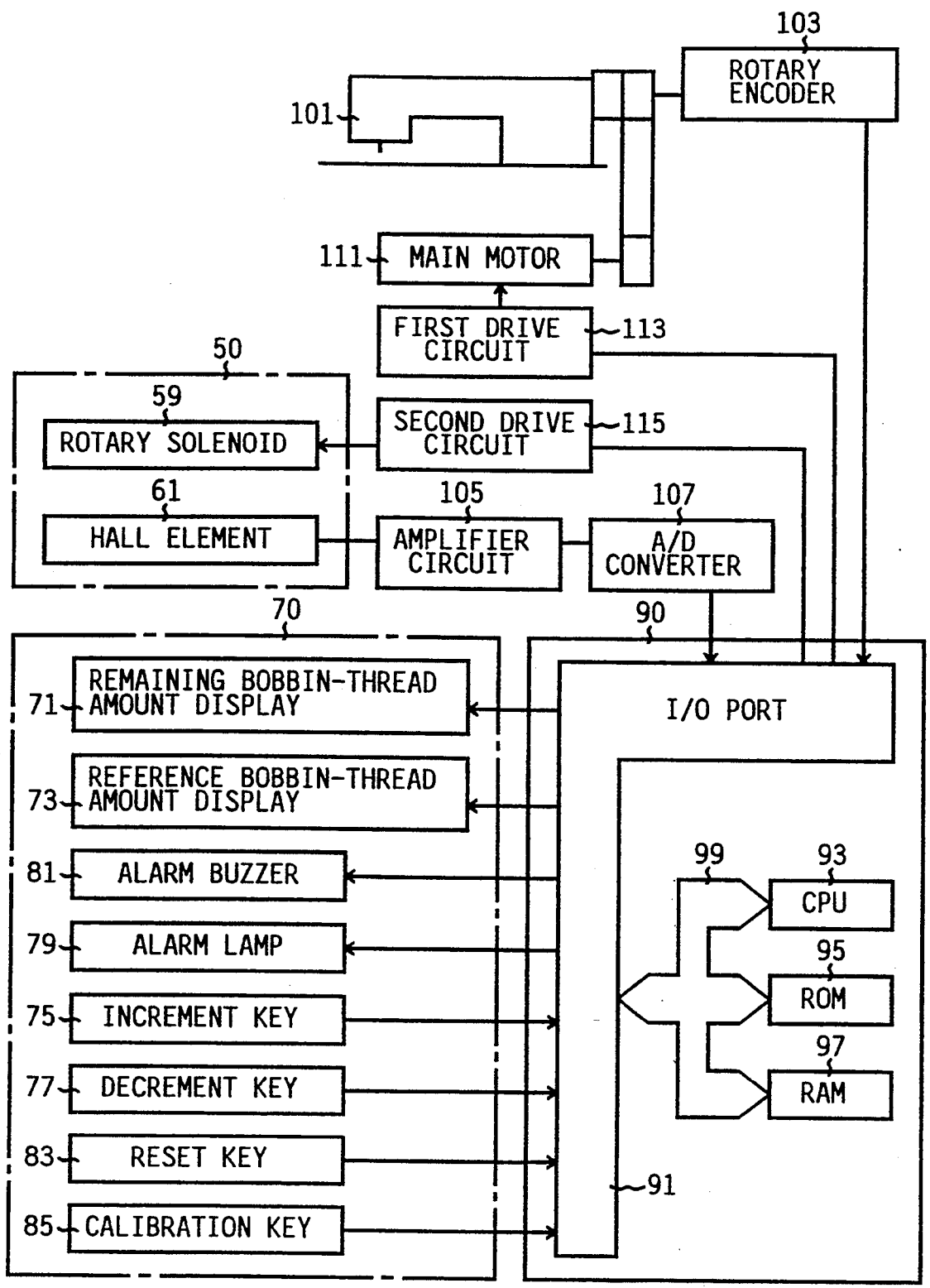
FIG. 4 is a diagrammatic view of the electric circuit of the measuring apparatus of FIG. 1.

As shown in FIG. 4, the detector part 50 and the display panel 70 are connected to the electronic control circuit 90 which serves for measuring the remaining amount of the bobbin thread 43, lighting the alarm lamp 79, and triggering the alarm buzzer 81. The control circuit 90 is essentially constituted by an input and output (I/O) port 91 for generating signals to, and receiving signals from, external devices; a central processing unit (CPU) 93 for processing signals or data; the ROM 95 for storing control programs including the remaining bobbin-thread amount measure routine (described in detail later); the RAM 97 for temporarily storing various data processed by the CPU 93; and electric bus line 99 for electrically connecting between the I/P port 91, CPU 93, ROM 95, and RAM 97 and transmitting signals to and from those components.

Upon operation of the increment key 75, decrement key 77, reset key 83, or calibration key 85 on the display panel 70, an appropriate signal is sent to the I/O port 91. Additionally, the output of a rotary encoder 103 which detects the angular position of a main shaft provided in an arm 101 of the sewing machine, is connected to the I/O port 91 of the control circuit 90. Furthermore, the voltage variation generated in the Hall element 61 is supplied, as the displacement signal indicative of the displacement of the measurement bar 53, to the I/O port 91 after being amplified by an amplifier circuit 105 and being converted into digital form by an analog to digital (A/D) converter 107.

The control circuit 90 generates, from the I/O port 91, drive signals to the first and second displays 71, 73 and the alarm lamp and buzzer 79, 81, respectively. Additionally, the control circuit 90 supplies drive signals to a main motor 111 for rotating the main shaft of the sewing machine arm 101 and the rotating hook 31 of the shuttle 30, and to the rotary solenoid 59 of the detector part 50, via a first and a second drive circuit 113, 115, respectively.

Figure 5:
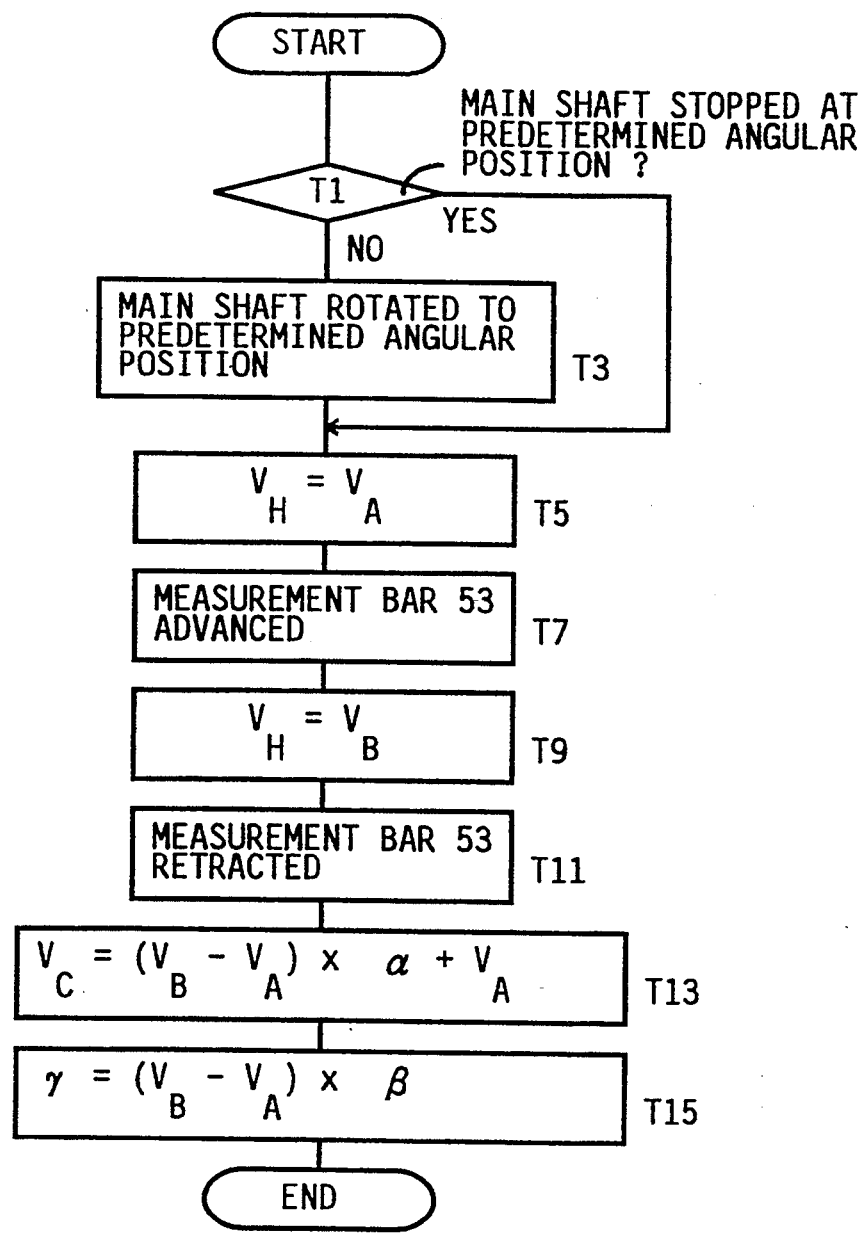
FIG. 5 is a flow chart representing the signal-characteristic determine and store routine implemented by the control circuit of the measuring apparatus of FIG. 1.
Figure 6:
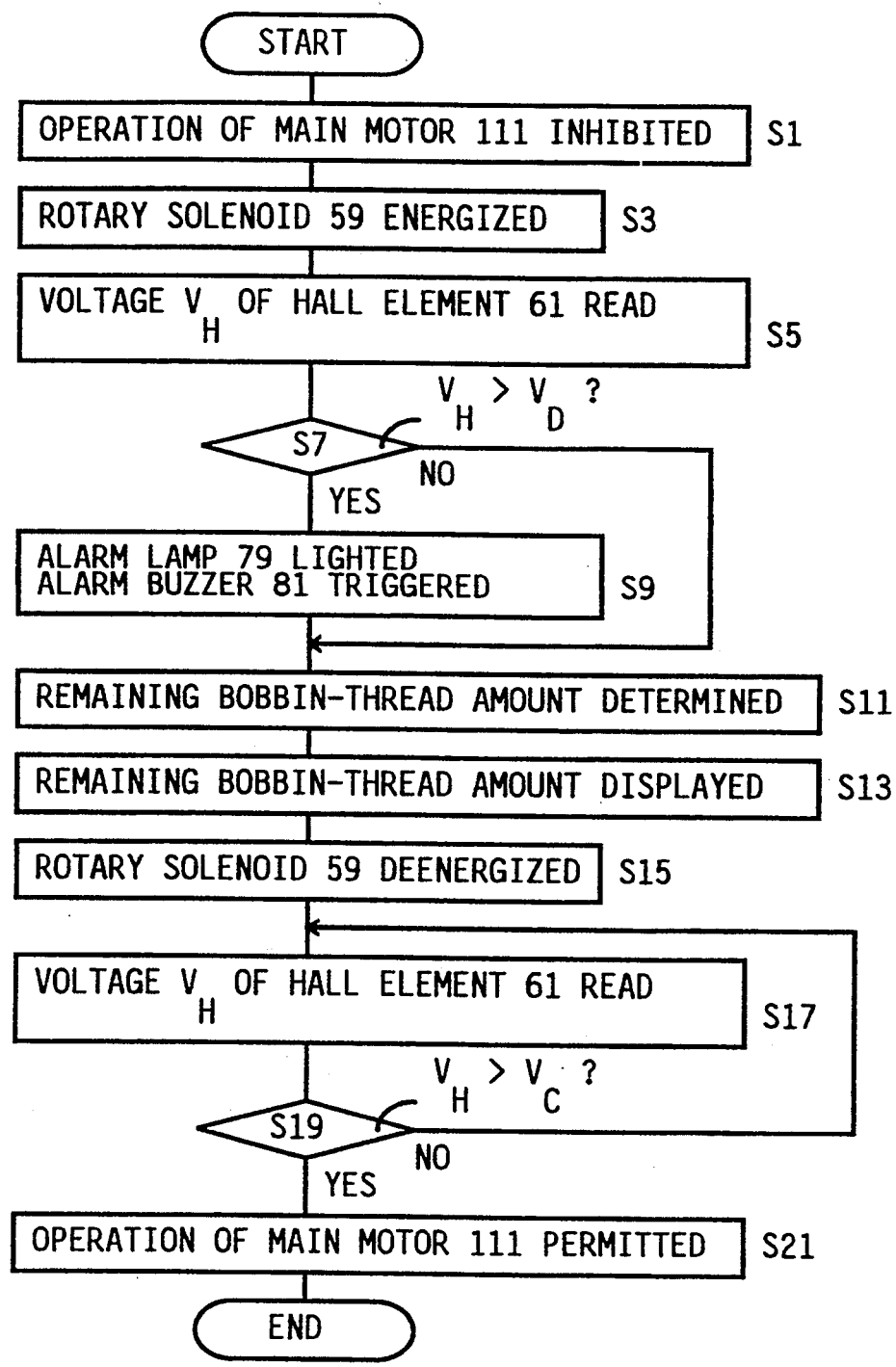
FIG. 6 is a flow chart representing the remaining bobbin-thread amount measure routine implemented by the control circuit of the measuring apparatus of FIG. 1.

Referring next to FIGS. 5, 6 and 7, there will be described the operation of the remaining bobbin-thread amount monitor constructed as described above. In the present embodiment, first, the control circuit 90 implements the signal characteristic determine and store routine represented by the flow chart of FIG. 5, with a "blank" bobbin 45 having no bobbin thread 43 being set in the shuttle 30, before the sewing machine starts the sewing operation, and subsequently the control circuit 90 implements the remaining bobbin-thread amount measure routine represented by the flow chart of FIG. 6.

Upon operation of the calibration key 85 while the sewing machine is not performing the sewing operation, i.e., while the main shaft of the machine arm 101 and the rotating hook 31 of the shuttle 30 are stopped, the control circuit 90 starts the signal characteristic determine and store routine of FIG. 5. First, at Step T1, the control circuit 90 or CPU 93 determines the angular position or phase of the main shaft being stopped, based on the output (i.e., detection signal) of the rotary encoder 103, and identifies whether or not the main shaft is stopped at the predetermined angular position in which the first opening 32 of the rotating hook 31 is aligned with the aperture 37 of the bobbin case 39 and the second opening 34 of the bobbin case holder 33.

If a negative judgment is made at Step T1, the control of the CPU 93 goes to Step T3 to automatically rotate the main shaft and stop the shaft at the predetermined angular position. On the other hand, if an affirmative judgment is made at Step T1, the control skips Step T3 and goes to Step T5. Steps T1 and T3 are provided for cases where the main shaft has been manually rotated before the calibration key 85 is operated after the main shaft is automatically stopped at the end of a prior sewing operation and consequently the first opening 32 is not aligned with the aperture 37 and the second opening 34. In such cases, the measurement bar 53 cannot be inserted into the bobbin case 39 through the aperture 37.

At Step T5, the CPU 93 reads a current, electric voltage, $V_H$, which is being generated in the Hall element 61, and stores in the RAM 97 the read value $V_H$ as a displacement-start voltage, $V_A$. Step T5 is followed by Step T7 to energize the rotary solenoid 59 and thereby displace the measurement bar 53 along the predetermined path relative to the bobbin 45 so that the free end of the bar 53 contacts a bobbin-thread supporting axis portion of the bobbin 45 on which bobbin thread 43 is to be wound but currently no thread is wound. The electric voltage $V_H$ generated in the Hall element 61 varies as the measurement bar 53 displaces along the predetermined path toward the bobbin 45, as shown in the upper graph of FIG. 7.

More specifically described, before the rotary solenoid 59 is energized, the measurement bar 53 is located at an initial, displacement-start position, A, and when solenoid 59 is energized, the bar 53 is displaced up to a zero-amount position, B, at which the free end of the bar 53 contacts the bobbin-thread supporting surface of the bobbin 45 with no bobbin thread thereon. The electric voltage $V_H$ generated in the Hall element 61 increases essentially directly proportionally to the amount of displacement of the measurement bar 53 along the predetermined path relative to the bobbin 45, as shown in FIG. 7. Step T7 is followed by Step T9 to read a current electric voltage $V_H$ of the Hall element 61 and stores in the RAM 97 the read value $V_H$ as a zero-amount voltage, $V_B$.

Subsequently, at Step T11, the rotary solenoid 59 is deenergized so that the measurement bar 53 is returned along the predetermined displacement path to the displacement-start position A. During this returning displacement, the bar 53 passes a safety position, C, which is just away from (i.e., slightly apart from) the position where the displacement path of the bar 53 intersects the outer limit (i.e., outer surface) of the locus of rotation of the rotating hook 31. Step T11 is followed by Step T13 to calculate an electric voltage, $V_C$, of the Hall element 61 corresponding to the safety position C, according to the following expression, and store the calculated value $V_C$ in the RAM 97:

$$V_C = (V_B - V_A) \times \alpha + V_A \quad (1)$$

wherein $\alpha$ is a constant.

The positional relationship of the safety position C relative to the displacement-start position A and the zero-amount position B depends upon the design or construction of a specific sewing machine. In the present embodiment, the above-indicated positional relationship is defined by a linear function equation representing a straight line approximating a portion of the curve shown in FIG. 7 which portion corresponds to the voltage variation $V_H$ between the two extreme positions A and B. Constant $\alpha$ is indicative of the relative position of the safety position C, and is pre-stored in the ROM 95.

Step T13 is followed by Step T15 to calculate a coefficient, $\gamma$, which is used in the remaining bobbin-thread amount measure routine of FIG. 6 (described later), according to the following expression, and store in the RAM 97 the determined coefficient $\gamma$:

$$\gamma = (V_B - V_A) \times \beta \quad (2)$$

wherein $\beta$ is a constant.

Constant $\beta$ is pre-determined such that coefficient $\gamma$ is equal to a value obtained by subtracting from voltage $V_B$ a voltage, $V_E$, of the Hall element 61 corresponding to a relative position (hereinafter, referred to as the full-amount position), E, of the bar 53 where the free end of the bar 53 contacts the outer surface of the roll of bobbin thread 43 which is wound on the bobbin 45 at the upper limit amount, i.e., 100%. Since the axial-end flanges of a bobbin 45 has standardized dimensions, full-amount position E of the bar 53 is also defined by the construction of a specific sewing machine. Therefore, coefficient $\gamma$ can be calculated by using the above expression (2). Thus, the implementation of the routine of FIG. 5 terminates.

Meanwhile, the operator sets a single-figure value corresponding to a desired reference bobbin-thread amount, on the second display 73 by operating the increment and decrement keys 75, 77. Upon setting of the reference bobbin-thread amount, the control circuit 90 automatically calculates a voltage, $V_D$, of the Hall element 61 corresponding to the set reference bobbin-thread amount, according to the signal characteristic, i.e., coefficient $\gamma$ stored in the RAM 97. Voltage $V_D$ is lower by a certain amount than voltage $V_B$. As described in detail below, the control circuit 90 decides to light the alarm lamp 79 and trigger the alarm buzzer 81 when actual voltage $V_H$ of the Hall element 61 exceeds thus determined voltage $V_D$.

Subsequently, the operator inserts a bobbin 45 on which a bobbin thread 43 is wound, into the shuttle 30, and starts sewing operation on the sewing machine. During the sewing operation, the control circuit 90 monitors the detection signal from the rotary encoder 103 and, when the main shaft is stopped and simultaneously the rotating hook 31 is stopped, the control circuit 90 automatically initiates the remaining bobbin-thread amount measure routine represented by the flow chart of FIG. 6.

First, at Step S1, the control circuit 90 or CPU 93 inhibits the operation of the main motor 111. Step S1 is followed by Step S3 to energize the rotary solenoid 59. As described previously, in the present situation, the first opening 32 of the rotating hook 31 is aligned with the second opening 34 of the bobbin case holder 33 and the aperture 37 of the bobbin case 39. Therefore, the measurement bar 53 is permitted to pass through the aperture 37, so that the free end of the bar 53 contacts the outer surface of the roll of bobbin thread 43 wound on the bobbin 45 accommodated in the bobbin case 39.

Subsequently, the control of the CPU 93 goes to Step S5 to read the actual voltage $V_H$ of the Hall element 61 in this situation, i.e., when the free end of the bar 53 contacts the outer surface of the bobbin thread 43. Step S5 is followed by Step S7 to judge whether or not the read voltage $V_H$ is higher than voltage $V_D$ corresponding to the selected reference bobbin-thread amount. If a negative judgment is made at Step S7, the control goes to Step S11. On the other hand, if a positive judgment is made at Step S7, the control goes to Step S9 to light the alarm lamp 79 and trigger the alarm buzzer 81 so as to issue an alarm sound. Then, the control proceeds with Step S11.

At Step S11, the CPU 93 calculates a remaining bobbin-thread amount, R, in percentage according to the following expression (3), and stores the calculated value R in the RAM 97:

$$R = \{(V_B - V_H)/\gamma\} \times 100 \ (\%)$$

Since $\gamma = V_B - V_E$ as described above, value R means the proportion of value (VB−VH) to coefficient $\gamma$.

Step S11 is followed by Step S13 to indicate on the first display 71 the remaining bobbin-thread amount R determined at Step S11, and subsequently by Step S15 to deenergize the rotary solenoid 59. Then, as previously described, the bar 53 starts returning to displacement-start position A. At the following Step S17, the CPU 93 starts to read actual voltage $V_H$ of the Hall element 61. Step S17 is followed by Step S19 to judge whether or not the read actual voltage $V_H$ has become less than voltage C corresponding to safety position C. If a positive judgment is made at Step S19, the control goes to Step S21. On the other hand, if the bar 53 has not passed safety position C yet, i.e., if a negative judgment is made, the control returns to Step S17.

If the rotation of the rotating hook 31 were started before the measurement bar 53 has passed safety position C during the returning movement thereof, the bar 53 would interfere or collide with the rotating hook 31, which would result in damaging both the hook 31 and the bar 53. Steps S17 and S19 are provided for ensuring that the bar 53 has passed safety position C. At Step S21, the CPU 93 permits the main motor 111 to operate, i.e., rotate the main shaft of the sewing machine arm 101 and the rotating hook 31 of the shuttle 30. Thus, the implementation of the routine of FIG. 6 terminates. In the present embodiment, a part of the control circuit 90 for implementing the routine of FIG. 5 serves as the signal characteristic determining and storing means, while a part of the control circuit 90 for implementing the routine of FIG. 6 serves as the remaining bobbin-thread amount determining means.

As is apparent from the foregoing description, the present remaining bobbin-thread amount monitor indicates a remaining bobbin-thread amount R in percentage on the first display 71 each time the rotation of the main motor 111 is stopped. Therefore, the operator can always know the current remaining bobbin-thread amount. Additionally, the operator can accurately estimate, in mind, when the bobbin thread 43 will be used up or exhausted, therefore he or she can effectively avoid the exhaustion of the bobbin thread 43 during the sewing operation.

Moreover, the present monitor lights the alarm lamp 79 and triggers the alarm buzzer 81 when the remaining amount R becomes less than the reference amount set through operation of the increment and decrement keys 75, 77. The operator can select, on the second display 73, an appropriate reference bobbin-thread amount depending upon, for example, the thickness of a bobbin thread 43 being used, therefore he or she can more effectively avoid the exhaustion of the bobbin thread 43 during the sewing operation.

Furthermore, before the sewing machine starts sewing operation, the present monitor apparatus determines voltage $V_A$ corresponding to displacement-start position A, and voltage $V_B$ corresponding to zero-amount position B, and determines, based on the determined voltages $V_A$, $V_B$, voltage VC corresponding to safety position C. That is, the invention apparatus re-calibrates the displacement signal generated by the Hall element 61. Even if the characteristic of the displacement signal of the Hall element 61, as shown in the graph of FIG. 7, may vary due to time-wise changes in the properties of, and/or positional changes in the location of, the Hall element 61 and/or the permanent magnet 65, voltage $V_C$ and coefficient $\gamma$ are adjusted by the recalibration so as to compensate for those changes. Thus, the present apparatus very reliably identifies that the measurement bar 53 has been retracted outside the outer limit (or outer surface) of the locus of the shuttle 30 or rotating hook 31, and therefore can effectively prevent the rotating hook 31 from colliding with the bar 53. For the same reason, the present apparatus very accurately measures a remaining bobbin-thread amount R.

While in the illustrated embodiment the characteristic of the displacement signal of the Hall element 61 is determined based on voltage $V_A$ for displacement-start position A and voltage $V_B$ for zero-amount position B, it is possible to determine the characteristic of the displacement signal by using voltage $V_C$ for safety position C and/or voltage $V_E$ for full-amount position E. In the latter case, voltage $V_C$ may be measured by displacing the measurement bar 53 toward the shuttle 30 so that the free end of the bar 53 contacts the outer surface of the rotating hook 31 which currently is stopped at an angular position where the first opening 32 of the hook 31 is not aligned with the aperture 37 of the bobbin case 39, i.e., the wall of the hook 31 covers the aperture 37. Meanwhile, voltage $V_E$ may be measured by displacing the measurement bar 53 toward the shuttle 30 so that the free end of the bar 53 contacts the outer surface of the roll of bobbin thread 43 which is wound on the bobbin 45 at the upper-limit amount or 100%, or the outer surface of a "blank" bobbin which is inserted in the shuttle 30 and whose diameter is equal to the diameter of the roll of the 100%-amount bobbin thread wound on the bobbin 45.

Additionally, it is possible to determine the characteristic of the displacement signal of the Hall element 61 by utilizing three or all of the above-indicated four voltages $V_A$, $V_B$, $V_C$, $V_E$. In this case, the present apparatus can more accurately measure the displacement amount of the measurement bar 53, i.e., remaining bobbin-thread amount R.

While in the illustrated embodiment the Hall element 61 is used for measuring the displacement amount of the measurement bar 53, it is possible to employ a different displacement sensor such as a variable-capacitance capacitor, a differential transformer, a potentiometer, or a magneto-resistive element associated with a "linear scale" which is constituted by a multiplicity of magnetic poles arranged in an array in which S poles and N poles alternate with each other in the direction of arrangement of the poles' array.

Although in the illustrated embodiment the shuttle 30 is of "horizontal-rotation" type wherein the shuttle 30 has a horizontal rotation axis and the bobbin case 39 is employed to hold the bobbin 45, the principle of the present invention may be applied to a sewing machine in which is employed a shuttle of "vertical-rotation" type wherein the rotation axis of the shuttle is vertical and no bobbin case which needs a specific aperture is used. Therefore, the construction of the vertical rotation-type shuttle remains simple as compared with the horizontal rotation-type shuttle 30.

While in the illustrated embodiment the measurement bar 53 is inserted into the shuttle 30 while the rotation of the rotating hook 31 is stopped, it is possible to insert the bar 53 into the shuttle 30 while the hook 31 is rotating, if the hook 31 rotates at a very low speed.

The rotary solenoid 59 and the arm member 57 employed in the illustrated embodiment may be replaced by a linear solenoid which linearly displaces the displacement-bar holder 63 toward the shuttle 30.

While the present invention has been described in detail with the specific particulars of the illustrated embodiment and its variations, it is to be understood that the present invention may be embodied with other changes, improvements, and modifications that may occur to those skilled in the art without departing from the spirit and scope of the invention defined in the appended claims.

What is claimed is:

1. An apparatus for measuring a remaining amount of a bobbin thread which is wound around a bobbin accommodated in a shuttle of a sewing machine, comprising:

a measurement bar which is displaceable along a displacement path from outside the shuttle toward an axis line of the bobbin inside the shuttle;

a measurement-bar driver which displaces said measurement bar along said displacement path so that a free end of the measurement bar contacts an outer surface of a roll of the bobbin thread wound around the bobbin;

a displacement sensor which detects the displacement of said measurement bar, said sensor generating a displacement signal representative of a continuous change in a displacement amount of the measurement bar;

signal-characteristic determining and storing means for determining a characteristic of said displacement signal based on respective values of the displacement signal when said measurement bar is located at a plurality of reference positions on said displacement path, and storing data indicative of the determined signal characteristic; and remaining-amount determining means for determining said remaining amount of the bobbin thread wound around the bobbin, based on the signal characteristic stored by said signal-characteristic determining and storing means and a value of said displacement signal when the free end of said measurement bar contacts the outer surface of the roll of the bobbin thread.

2. An apparatus according to claim 1, further comprising means for determining, based on the signal characteristic stored by said signal-characteristic determining and storing means and a reference bobbin-thread amount, a value of said displacement signal when the free end of said measurement bar contacts an outer surface of a roll of the bobbin thread which is wound around the bobbin in said reference bobbin-thread amount.

3. An apparatus according to claim 2, further comprising an input device which includes at least one manually operable member and sets said reference bobbin-thread amount in response to operation of said at least one manually operable member.

4. An apparatus according to claim 3, further comprising a display device which displays said reference bobbin-thread amount set by said input device.

5. An apparatus according to claim 1, further comprising an alarm device which informs an operator that said remaining amount of the bobbin thread determined by said remaining-amount determining means is less than a reference bobbin-thread amount.

6. An apparatus according to claim 1, further comprising a display device which displays said remaining amount of the bobbin thread determined by said remaining-amount determining means.

7. An apparatus according to claim 1, wherein said remaining-amount determining means determines said remaining amount of the bobbin thread in terms of a ratio thereof to an upper-limit bobbin-thread amount.

8. An apparatus according to claim 1, wherein the shuttle includes a rotating hook, the apparatus further comprising means for determining, based on the signal characteristic stored by said signal-characteristic determining and storing means, a value of said displacement signal when the free end of said measurement bar is located, on said displacement path, at a safety position just away from an outer limit of a locus of rotation of the rotating hook.

9. An apparatus according to claim 8, further comprising an inhibiting device which inhibits operation of a driver which rotates the rotating hook, for at least a time duration in which the free end of said measurement bar is located between the bobbin and the outer limit of the locus of rotation of the shuttle on said displacement path.

10. An apparatus according to claim 1, wherein the shuttle includes a rotating hook, the apparatus further comprising a control device which automatically operates said measurement-bar driver, said displacement sensor, and said remaining-amount determining means so as to determine said remaining amount of the bobbin thread, in a condition in which the rotating hook is being stopped at a non-interference angular position where the hook does not interfere with said displacement path along which said measurement bar displaces.

11. An apparatus according to claim 10, wherein said control device automatically operates said measurement-bar driver, said displacement sensor, and said remaining-amount determining means so as to determine said remaining amount of the bobbin thread, each time the rotating hook is stopped at said non-interference angular position.

12. An apparatus according to claim 1, further comprising:
   a manually operable member which is operable to input a signal-characteristic determination command to determine the characteristic of said displacement signal; and
   a control device which operates, in response to operation of said manually operable member, said measurement-bar driver, said displacement sensor, and said signal-characteristic determining and storing means so as to determine the characteristic of said displacement signal.

13. An apparatus according to claim 12, wherein the shuttle includes a rotating hook, the apparatus further comprising a rotating device which automatically rotates the rotating hook to a non-interference angular position where the hook does not interfere with said displacement path, in a case where the hook is being stopped at an angular position different from said non-interference angular position when said manually operable member is operated to input said signal-characteristic determination command.

14. An apparatus according to claim 1, wherein said measurement-bar driver comprises:
   an actuator including an output member;
   a connecting device provided between said measurement bar and said output member of said actuator, so as to connect the measurement bar and the output member to each other such that the bar is movable relative to the output member in opposite directions in which the bar advances toward, and retracts away from, the bobbin of the shuttle, said connecting device defining a limit of the movement of said measurement bar relative to said output member in the direction in which the bar advances toward the bobbin; and
   an elastic member which biases said measurement bar toward said limit of movement thereof.

15. An apparatus according to claim 14, wherein said connecting device comprises:
   a movable member which is engaged with said output member of said actuator and which is engaged with said measurement bar such that said movable member is movable relative to the measurement bar along an axis line of the bar;
   a support member which supports said movable member and said measurement bar such that the movable member and the measurement bar are movable along said axis line of the bar; and
   an engagement portion defined by said measurement bar,
   said elastic member being disposed between said measurement bar and said movable member to bias the measurement bar and the movable member in a direction in which the movable member is to be engaged with said engagement portion of the bar, the engagement of the movable member and the engagement portion defining said limit of movement of the bar relative to said output member of said actuator in the direction in which the bar advances toward the bobbin.

16. An apparatus according to claim 15, wherein said actuator comprises a rotary actuator which rotates said output member about an axis line of the actuator so that the output member displaces said movable member along said axis line of the measurement bar.

17. An apparatus according to claim 1, wherein said plurality of reference positions on said displacement path comprises at at least one of (a) a zero-amount position where the free end of said measurement bar contacts a thread-supporting axial portion of the bobbin from which all the bobbin thread has been removed, (b) a displacement-start position where the displacement of said measurement bar starts toward the the bobbin along said displacement path, (c) a position where the free end of said measurement bar contacts an outer surface of a rotating hook as a part of the shuttle which surface defines an outer limit of a locus of rotation of the shuttle, and (d) a full-amount position where the free end of said measurement bar contacts an outer surface of a roll of the bobbin thread which is wound in an upper-limit amount around said axial portion of the bobbin.

18. An apparatus for measuring a remaining amount of a bobbin thread which is wound around a bobbin accommodated in a shuttle of a sewing machine, comprising:
   a measurement bar which is displaceable along a displacement path from outside of the shuttle toward an axis line of the bobbin inside of the shuttle;
   a measurement-bar driver which displaces said measurement bar along said displacement path so that a free end of the measurement bar contacts an outer surface of a roll of the bobbin thread wound around the bobbin;
   a displacement sensor which detects the displacement of said measurement bar, said sensor generating a displacement signal representative of a continuous change in a displacement amount of the measurement bar;
   remaining-amount determining means for determining said remaining amount of the bobbin thread wound around the bobbin, based on a value of the displacement signal when the free end of said measurement bar contacts the outer surface of the roll of the bobbin thread;
   an input device which includes a manually operable member for setting a reference bobbin-thread amount in response to operation of said manually operable member; and
   an alarm device which informs an operator that said remaining amount of the bobbin thread determined by said remaining-amount determining means is less than said reference bobbin-thread amount.

19. A bobbin-thread supplying apparatus for supplying a bobbin thread which cooperates with a needle thread carried by a sewing needle of a sewing machine to form stitches into a work sheet, comprising:
   (A) a shuttle including
      a bobbin around which said bobbin thread is wound,
      a rotating hook which is rotatable for catching said needle thread, said rotating hook defining an outer limit of a locus of rotation of the shuttle,
      a rotating-hook driver which rotates said rotating hook;
   (B) a remaining bobbin-thread measuring device including
      a measurement bar which is displaceable along a displacement path from outside of the shuttle toward an axis line of the bobbin inside of the shuttle, a measurement-bar driver which displaces said measurement bar along said displacement path so that a free end of the measurement bar contacts an outer surface of a roll of the bobbin thread wound around the bobbin, a displacement sensor which detects the displacement of said measurement bar, said sensor gathering a displacement signal having more than two values representative of a continuous change in displacement amount of the measurement bar, remaining-amount determining means for determining a remaining amount of the bobbin thread wound around the bobbin, based on a value of said displacement signal when the free end of said displacement bar contacts the outer surface of the roll of the bobbin thread, a display device which displays said remaining amount of the bobbin thread determined by said remaining-amount determining means; and (C) a control device which controls operation of said rotating-hook driver and operation of said remaining bobbin-thread measuring device including said measurement-bar driver.

20. A bobbin-thread supplying apparatus according to claim 19, wherein said shuttle further includes a bobbin case which accommodates said bobbin, said bobbin case having an aperture which allows the free end of said measurement bar to pass therethrough and contact the outer surface of the roll of the bobbin thread.

21. An apparatus according to claim 19, wherein said remaining-amount determining means determines said remaining amount of the bobbin thread in terms of a ratio thereof to an upper-limit bobbin-thread amount, and said display device displays said remaining amount of the bobbin thread in terms of said ratio thereof to said upper-limit bobbin-thread amount determined by said remaining-amount determining means.

22. An apparatus according to claim 19, further comprising signal-characteristic determining and storing means for determining a characteristic of said displacement signal based on respective values of the displacement signal when said measurement bar is located at a plurality of reference positions on said displacement path, and storing data indicative of the determined signal characteristic, said remaining-amount determining means determining said remaining amount of the bobbin thread based on the signal characteristic stored by said signal-characteristic determining and storing means and the value of said displacement signal when the free end of said displacement bar contacts the outer surface of the roll of the bobbin thread.

* * * * *